United States Patent [19]

Hönig et al.

[11] Patent Number: 4,652,353

[45] Date of Patent: Mar. 24, 1987

[54] PROCESS FOR PRODUCING MULTIPLE-COAT PAINT SYSTEMS BASED ON THERMICALLY POLYMERIZABLE RESIN SYSTEMS AS BINDERS AND PAINT SYSTEMS THEREBY PRODUCED

[75] Inventors: Helmut Hönig; Georg Pampouchidis, both of Graz, Austria

[73] Assignee: Vianova Kunstharz, A.G., Werndorf, Austria

[21] Appl. No.: 695,310

[22] Filed: Jan. 28, 1985

[30] Foreign Application Priority Data

Jan. 27, 1984 [AT] Austria .................................. 268/84

[51] Int. Cl.⁴ ............................................. C25D 13/08
[52] U.S. Cl. ............................... 204/180.6; 204/181.7
[58] Field of Search ........................... 204/180.6, 181.7

[56] References Cited

U.S. PATENT DOCUMENTS

| | | | |
|---|---|---|---|
| 3,501,391 | 3/1970 | Smith et al. | 204/180.6 |
| 3,761,371 | 9/1973 | Dickie et al. | 204/181.7 |
| 4,025,409 | 5/1977 | McGinnis | 204/181.7 |
| 4,029,561 | 6/1977 | McGinnis | 204/181.7 |
| 4,035,274 | 7/1977 | McGinnis | 204/181.7 |
| 4,039,414 | 8/1977 | McGinnis | 204/181.7 |
| 4,166,017 | 8/1979 | McGinnis | 204/181.7 |

FOREIGN PATENT DOCUMENTS

| | | | |
|---|---|---|---|
| 48-4448 | 2/1973 | Japan | 204/181.7 |
| 50-76140 | 6/1975 | Japan | 204/180.6 |

*Primary Examiner*—Terryence Chapman
*Attorney, Agent, or Firm*—A. W. Breiner

[57] ABSTRACT

A process for producing multiple-coat paint systems is described wherein a cathodically electro-depositable primer containing thermally polymerizable synthetic resins as the binder, immediately prior to the application of an additional coating, is irradiated with ionizing irradiation for a period of from one to 20 seconds. The irradiation for the short period of time cures the primer so that subsequent coatings applied to the primer do not detrimentally affect the primer coating or the finished paint system.

10 Claims, No Drawings

PROCESS FOR PRODUCING MULTIPLE-COAT PAINT SYSTEMS BASED ON THERMICALLY POLYMERIZABLE RESIN SYSTEMS AS BINDERS AND PAINT SYSTEMS THEREBY PRODUCED

FIELD OF INVENTION

The invention is directed to a process for producing a multiple-coat paint system based on cathodically electro-depositable (CED) primers which contain thermically polymerizable synthetic resins as binders, and to the paint system obtained. More particularly, the process of the present invention includes treating CED-primers with ionizing irradiation before a subsequent coating.

BACKGROUND AND PRIOR ART

U.S. Pat. Nos. 4,320,220; 4,238,594, and 4,174,332; and AT-PS 366 082 disclose binders for cathodically depositable coating compositions (CED-paints) which, due to their chain end double bonds, crosslink on stoving substantially by ethylenic polymerization. Binders of this type have been used in practice on a large scale, particularly by the automobile industry, whereby thermic crosslinking has to be effected with an object, i.e., a car body, at a temperature of from about 170° to 180° C. in order to attain the high protection against corrosion as required by the industry. For technological reasons and to save energy, industry now demands to a rising extent the reduction of the necessary curing temperatures for the primer to a temperature of from about 150° C. to a maximum of 170° C. It is essential, however, that the corrosion resistance of the primer coating obtained or of the total paint coating system not be decreased.

In general, the binders disclosed in the above-mentioned references provide satisfactory crosslinking of the paint film at reduced stoving temperature. In practice, however, it has been found that with the reduced stoving temperatures of between about 140° C. and a maximum of 170° C., coatings subsequently applied to the CED-primer cause the primer to swell at the surface of the primer. The tendency to swell at the surface of the primers, which increases with decreasing stoving temperature, is believed to be caused by the strong solvency power of the organic solvents contained in the coatings applied to the primer. This effect shows strongest when the coating is applied immediately after baking of the primer, and diminishes on storage of the primer coated objects before application of an additional coating. For example, a primer cured at 150° C. is totally resistant to such solvents after a maximum storage of three weeks. These changes in the properties at the surface of the primer upon storage, in many cases, are the reason for the improvement in the multiple-coat system through hardening of the subsequent filler and finishing coatings which results in an increased impact resistance of the final paint system. Intercoat adhesion is also essentially enhanced for materials used as protective materials for car underbodies or to sealants used on car bodies with aging of the primer. It is evident, however, that such long storage times cannot be realized in practice. Normally, the following coats are applied to the primer within a maximum period of one hour after stoving.

PRIMARY OBJECTS AND GENERAL DESCRIPTION OF INVENTION

It is a primary object of the present invention, therefore, to improve the surface hardness of primers cured at from 140° to 170° C. in order that swelling by organic solvents is reduced to an extent which allows immediate application of the next coating without impairing the quality of the primer.

Surprisingly, it has been determined that the disadvantages of solvent impairment of the primer coatings can be avoided if the CED-primers based on binders crosslinked through thermal polymerization at from 140° to 180° C. are subjected for a short period of time to an ionizing irradiation, particularly UV-irradiation, prior to the application of the next coat.

Curing of electro-deposition (ED) paints by ionizing irradiation has been known from the literature. For example, U.S. Pat. Nos. 4,035,274 and 4,066,523 disclose the combination of baking and crosslinking by ionizing irradiation. In these cases, during the first phase of baking the deposited film is allowed to flow out, crosslinking being effected through UV-irradiation. The binders disclosed in the patents are adjusted to such method of crosslinking. The methods disclosed, however, are not suitable for objects having difficultly accessible or inaccessible parts. Thus, methods such as described in the above and other patents describing curing with irradiation techniques cannot be used for coating of objects such as car bodies, etc., which have cavities and shielded areas not affected by irradiation.

The present invention is, therefore, concerned with a process for producing multiple-coat paint systems which utilize a CED-primer containing thermically polymerizable synthetic resins as the binder and at least one additional coat based on solvent-dissolved resins, the process being characterized in that the cathodically deposited primer is substantially totally cured at a temperature from 140° to 180° C. and, immediately prior to the application of the next coat, is irradiated with ionizing irradiation for a period of time from one to 20 seconds. It was unexpected that with only a slight irradiation the film surface could be rendered resistant to the influence of solvents in the next coating, including surface swelling, and thereby avoiding the deficiencies in film formation caused by the swelling. Furthermore, adverse influences due to the basic character of the cationic primer on the curing process in the following coat, which in most cases is catalyzed by acids, are prevented. A further effect achieved by the method of the invention is a marked improvement in adhesion to polyvinylchloride (PVC) materials which are used for protection of car underbodies; and adhesion to sealants or to metal-bonding compounds as are used mainly in the automobile industry.

The primers used according to the present invention contain as the binder synthetic resins such as those disclosed in the references referred to above, i.e., U.S. Pat. Nos. 4,320,220; 4,238,594, and 4,174,332; and AT-PS 366 082. These resins are water-dilutable cationic binders carrying a sufficient number of chain end double bonds which crosslink on stoving by thermal polymerization. Preferably modified epoxy resins based on Bisphenol-A or on phenol novolaks serve as components of these CED-systems. The preparation and application of these resins are described in detail in the references noted above.

The disadvantage of curing by irradiation as noted above in that shielded sections, including cavities, cannot be irradiated, is not critical in accordance with the present invention since the subsequent coats to be applied are substantially applied to visible surfaces which are easily accessible to irradiation. The remaining surfaces, uncoated by the second coating, to the extent coated with primer will cure to a hard coating with time.

The subsequent coatings applied onto the primer normally include a filler coating as an intermediate coat, followed by a finish coating; or, optionally, a finishing coat only can be utilized. Filler coatings are normally based on alkyd/amino resin systems dissolved in solvents; whereas the finishing coatings normally contain as the binders either an alkyd/amino resin in combination with, for example, an acrylic resin or an acrylic resin/amino resin combination. It is known that the crosslinking reaction of these systems is catalyzed with acids. The compositions of these systems are known to one skilled in the art and are described in the literature, for example *Ullmanns Encyklopadie der Technischen Chemie*, 4th Edition, Volume 15; or H. Kittel, *Lehrbuch der Lacke und Beschichtungen*, W. A. Colomb.

Another type of subsequent coatings to be applied to the primer are materials which are applied for the protection of car underbodies or as sealants or as metal-bonding compounds. In most cases, these materials are plastisols, i.e., dispersions of plastic materials, in particular PVC, in plasticizers.

The primer is applied in known manner by the CED process to a normally pretreated substrate, and in the automobile industry in particular to phosphated steel. In this method, the object to be coated is wired as the cathode of the electro-deposition system and the paint, containing as the binder at least a portion of a cationic resin, is deposited by applying direct current. After rinsing the adherent bath material, the primer is cured by thermic polymerization at from 140° to 180° C. Prior to the application of the next coat, the stoved primer according to the invention is subjected to a short irradiation with UV-light. Irradiation time is from one to 20 seconds. Suitable sources of irradiation include from available low, medium, or high pressure mercury lamps, as are described in the literature, for example *UV-Curing, Science and Technology*, S. P. Papas, Technol. Market Corp., Stamford, Conn. USA, 1978. The use of UV-sensitizers is not necessary for the process of the invention since the substantial crosslinking reaction is a thermic polymerization reaction. In place of UV-light, irradiation can be carried out with other ionizing rays, such as electron rays. The subsequent coating is applied in known manner through spraying and is cured by stoving.

PREFERRED EMBODIMENTS OF INVENTION

The following examples illustrate presently preferred embodiments of the invention without intent to limit the scope thereof.

EXAMPLE 1

Zinc-phosphated steel panels, as are used in the automobile industry, are coated in the conventional manner with a cathodically depositable electro-deposition paint. The paint was formulated based on a binder according to Example 7 of U.S. Pat. No. 4,174,332 utilizing the following ingredients:
  100.0 parts by weight binder, 100% solids content
  0.3 parts by weight carbon black
  3.0 parts by weight lead silicate
  36.7 parts by weight titanium dioxide The coated panels were rinsed with water in the conventional manner and cured for 17 minutes with an object temperature of 150° C. The film thickness of the primer is 22±2 μm. About one hour after cure the panels were irradiated for 6, 12, and 18 seconds each with an available UV-irradiation source developed for the curing of paints. The irradiation source used in this example was a lamp marketed as "Primarc Minicure, Mark 2" by Primarc (Jigs and Lamps) Ltd., Henley-on-Thames, England, which is a medium-pressure mercury lamp (200 watt/inch=78.7 watt/cm).

The panels after curing were evaluated in the following way:

1. Acetone test

A cotton pad soaked with acetone was pressed onto the paint surface for 60 seconds. Immediately after removing the pad, the paint was scratched and the results recorded based on a scale of 1 to 5, wherein 1 is no attack; 2 is where it can be scratched; and 5 is where it can easily be scratched.

2. Recoatability and adhesion of finishing coat

Onto the primed panel, a commercial acid catalyzed automobile finish based on an acrylic resin/amino resin combination was applied and stoved for 30 minutes at 120° C. (dry film thickness 70±5 μm).

The chip resistance of the total coating system is recorded on impact of steel gravel. The degree of peel-off of the upper coat is recorded based on a scale of 1 to 5, wherein 1 is no peel-off, and 5 is total peel-off.

3. Adhesion to PVC

A commercially available PVC-plastisol paste is applied to the panel in a width of 3 cm and a thickness of 2 mm; and is cured for 7 minutes at 125° C., object temperature. The ease of tear-off of the PVC layer is recorded based on a scale of 1 to 5, wherein 1 is peel-off with difficulty only, and 5 is where the coating can be easily peeled off.

| Results of Testing: | | | | |
|---|---|---|---|---|
| | UV-Irradiation Time In Seconds | | | |
| | 0 | 6 | 12 | 18 |
| Acetone Test | 5 | 1-2 | 1 | 1 |
| Recoatability and Chip Resistance | 5 | 2-3 | 1 | 1 |
| PVC-adhesion[+] | 5 | 2 | 1-2 | 1 |

[+]The following products were tested:
Car underbody protection: Intercol, Thermocoat 01779, which is a PVC-plastisol marketed by Intercoat Klebund Riechstoff GmbH, Bodenheim/Rhein
Coarse sealing compound: Teroson AKD 475000, which is a sealant marketed by Teroson GmbH, Heidelberg
Fine sealing compound: Teroson AKD 473001, which is a sealant marketed by Teroson GmbH, Heidelberg

EXAMPLE 2

In a test series a variety of paint systems were tested for the effect of UV-irradiation on intercoat adhesion. The CED-paints used had the formulation as follows:
  100.0 parts by weight binder (100% resin solids)
  0.3 parts by weight carbon black
  3.0 parts by weight silicate
  36.7 parts by weight titanium dioxide The binder used in the CED-paints consisted of the following resin combinations:

Binder A: Binder combination according to Example 4 of EP-B1-00 49 369

Binder B: Combination of 30 parts (100% resin solids) of a binder according to Example 29 of U.S. Pat. No. 4,174,332; and 70 parts (100% resin solids) according to Example 8 of EP-B1-00 12 463.

The CED-primers were applied and irradiated as described in Example 1. The irradiation source was an UV-radiator Hanovia, Type 8512 A 431 (radiation intensity 80 W/cm, at 365 nm; producer Ulrich Steinemann AG, St. Gallen, Switzerland). Distance to the object: 8 cm.

A PVC layer was applied to the primed panels at the dimensions of 2 mm thickness and 1 cm breadth, thirty minutes after cure of the CED-primer and stoved for 7 minutes at 140° C., object temperature. The adhesion was tested one hour after cure. The PVC materials were available PVC-plastisol car underbody protective materials marketed under the trademark Stankiewicz 2252 by Stankiewicz GmbH, Celle, West Germany; and a sealant for welding seams used in the automobile industry marketed under the trademark Dekalin 9003 by Dekalin, Deutsche Klebstoff Werke, Hanau, West Germany. The results, showing the evident influences of UV-cure on the cured films, are listed in the following table:

| CED-Paint | Irradiation Time In Seconds | | | |
|---|---|---|---|---|
| | 0 | 5 | 10 | 15 |
| Car Underbody Protection | | | | |
| Binder A | 5 | 2 | 1 | 1 |
| Binder B | 5 | 2-3 | 1 | 1 |
| Welding Seam Sealant | | | | |
| Binder A | 5 | 3 | 1-2 | 1 |
| Binder B | 5 | 3-4 | 2 | 2—2 |

Irradiation under $N_2$-atmosphere does not change the results.

As will be apparent to one skilled in the art, various modifications can be made within the scope of the aforesaid description. Such modifications being within the ability of one skilled in the art form a part of the present invention and are embraced by the appended claims.

It is claimed:

1. Process for producing a multiple-coat paint system which includes a CED-primer containing thermically polymerizable synthetic resins as the binder and at least an additional coating based on solvent-dissolved resins, comprising the steps of
   (a) coating an electrically conductive substrate surface by cathodic deposition with a primer containing a thermically polymerizable binder resin system,
   (b) curing the deposited primer at a temperature of from 140° to 180° C.,
   (c) irradiating the cured primer with ionizing radiation for a period of one to 20 seconds,
   (d) applying a solvent based additional coating, and
   (e) curing the additional coating.

2. The process according to claim 1 wherein the primer is irradiated with UV-light.

3. The multiple-coat paint system produced by the process of claim 2.

4. The process according to claim 1 wherein said additional coating is an alkyd resin/amino resin combination.

5. The process according to claim 4 wherein said alkyd resin/amino resin combination is catalyzed with an acid catalyst.

6. The process according to claim 1 wherein said additional coating is a PVC-plastisol.

7. The multiple-coat paint system produced by the process of claim 1.

8. The process of claim 1 wherein said additional coating is applied by spraying.

9. The process of claim 1 wherein said additional coating is cured by application of heat.

10. The process of claim 1 wherein the primer coating is rinsed prior to curing.

* * * * *